(12) United States Patent
Wennersten et al.

(10) Patent No.: US 10,154,261 B2
(45) Date of Patent: Dec. 11, 2018

(54) ENCODER AND METHOD FOR VIDEO PROCESSING

(71) Applicant: TELEFONAKTIEBOLAGET L M ERICSSON (PUBL), Stockholm (SE)

(72) Inventors: Per Wennersten, Årsta (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 222 days.

(21) Appl. No.: 15/025,919

(22) PCT Filed: Oct. 2, 2013

(86) PCT No.: PCT/SE2013/051152
§ 371 (c)(1),
(2) Date: Mar. 30, 2016

(87) PCT Pub. No.: WO2015/050485
PCT Pub. Date: Apr. 9, 2015

(65) Prior Publication Data
US 2016/0301930 A1    Oct. 13, 2016

(30) Foreign Application Priority Data
Oct. 1, 2013  (WO) ................ PCT/SE2013/051141

(51) Int. Cl.
*H04N 19/119*    (2014.01)
*H04N 19/96*    (2014.01)
(Continued)

(52) U.S. Cl.
CPC ......... *H04N 19/119* (2014.11); *H04N 19/126* (2014.11); *H04N 19/147* (2014.11);
(Continued)

(58) Field of Classification Search
None
See application file for complete search history.

(56) References Cited

U.S. PATENT DOCUMENTS

| 2012/0230411 | A1  | 9/2012 | Liu et al. |
| 2014/0269919 | A1* | 9/2014 | Rodriguez ........... H04N 19/513 375/240.16 |

OTHER PUBLICATIONS

Xiong, Jian, et al., "Fast and Efficient Prediction Unit Size Selection for HEVC Intra Prediction", 2012 IEEE International Symposium on Intelligent Signal Processing and Communication Systems (ISPACS 2012), pp. 366-369 (Nov. 2012).*

(Continued)

*Primary Examiner* — William C Vaughn, Jr.
*Assistant Examiner* — Lindsay J Uhl
(74) *Attorney, Agent, or Firm* — Murphy, Bilak & Homiller, PLLC (57) ABSTRACT

The embodiments of the present invention relate to a method and an encoder for encoding a bitstream representing a sequence of pictures of a video stream. The pictures are divided into units which are further divided into blocks of a first size, wherein the blocks can be divided further into four quarter blocks of a second size. The encoder comprises a processor (810) and a memory (820), said memory (820) containing instructions executable by said processor (810) whereby said encoder is operative to: calculate a result of at least one comparison involving a scaled version of a first error measure associated with one of the quarter blocks, a scaled version of a second error measure associated with at least the remaining quarter blocks; and a threshold C. When at least one of said comparisons gives a Boolean result of a first kind, the encoder is operative to determine that the unit could be divided into quarter blocks of the second size to be used for encoding the picture. When all of said comparisons give a Boolean result of a second kind different from the first (Continued)

kind, wherein the Boolean result of the second kind is indicative of a difference being smaller than if the Boolean result would be of the first kind, wherein said difference is the scaled version of the second error measure subtracted from the scaled version of the first error measure, the encoder is operative to determine that the unit should be divided into blocks of the first size to be used for encoding the picture.

14 Claims, 5 Drawing Sheets

(51) Int. Cl.
    *H04N 19/176* (2014.01)
    *H04N 19/147* (2014.01)
    *H04N 19/126* (2014.01)
    *H04N 19/895* (2014.01)

(52) U.S. Cl.
    CPC ......... *H04N 19/176* (2014.11); *H04N 19/895* (2014.11); *H04N 19/96* (2014.11)

(56) References Cited

OTHER PUBLICATIONS

Zhang, Hao, et al., "Early Termination Schemes for Fast Intra Mode Decision in High Efficiency Video Coding", 2013 IEEE International Symposium on Circuits and Systems (ISCAS), pp. 45-58 (May 2013).*

Cho, Seunghyun et al., "Fast CU Splitting and Pruning for Suboptimal CU Partitioning in HEVC Intra Coding", IEEE Transactions on Circuits and Systems for Video Technology, vol. 23, No. 9, Feb. 25, 2013, 1555-1564.

Tan, Hui Li et al., "On Fast Coding Tree Block and Mode Decision for High-Efficiency Video Coding (HEVC)", IEEE, International Conference on Acoustics, Speech, and Signal Processing (ICASSP), Mar. 25-30, 2012, 825-828.

Teng, Su-Wei et al., "Fast Mode Decision Algorithm for Residual Quadtree Coding in HEVC", IEEE, Visual Communications and Image Processing (VCIP), Nov. 6-9, 2011, 1-4.

Zhang, Hao et al., "Early Termination Schemes for Fast Intra Mode Decision in High Efficiency Video Coding", IEEE, International Symposium on Circuits and Systems (ISCAS), May 19-23, 2013, 45-48.

* cited by examiner

ENCODER AND METHOD FOR VIDEO PROCESSING

TECHNICAL FIELD

The embodiments relate to video processing and in particular to a method and an encoder for making certain decisions for encoding in an efficient way.

BACKGROUND

In video processing, given an original uncompressed video, the purpose of a video encoder is to produce a compressed representation of the original video that is smaller in size but can be decompressed to produce a video closely resembling the original video. When designing an encoder, there is a trade-off between encoder complexity and compression efficiency: the more time an encoder has at its disposal, the more complex methods can be used for compression, the better its output will usually be for a given bitrate. In some applications, such as videoconferencing, it is useful to have an encoder working in real-time, making it challenging to achieve good compression.

High Efficiency Video Coding (HEVC), also referred to as H.265, is a video coding standard being developed in Joint Collaborative Team-Video Coding (JCT-VC). JCT-VC is a collaborative project between Moving Picture Experts Group (MPEG) and International Telecommunication Union-Telecommunication Standardization Sector (ITU-T). Currently, an HEVC Model (HM) is defined that includes a number of tools and is considerably more efficient than the existing video coding standard H.264/Advanced Video Coding (AVC).

HEVC is a block-based hybrid video coded that uses both inter prediction (prediction from previous coded pictures) and intra prediction (prediction from previous coded pixels in the same picture). Each picture is divided into quadratic treeblocks (corresponding to macroblocks in H.264/AVC) that can be of size 16×16, 32×32 or 64×64 pixels. A variable CtbSize is used to denote the size of treeblocks expressed as number of pixels of the treeblocks in one dimension i.e. 16, 32 or 64.

Hence when encoding a frame of video with H.265, the frame is split into the treeblocks, each treeblock is then hierarchically split into Coding Units (CUs), ranging in size from 64×64 to 8×8 pixels.

Compressing a CU is done in two steps: first the pixel values in the CU are predicted from previously coded pixel values either in the same frame or in previous frames. After prediction, the difference between the predicted pixel values and the actual values is calculated and transformed.

Furthermore, prediction can be performed for an entire CU at once, or on smaller parts separately. This is done by defining Prediction Units (PUs), which may be the same size as the CU for a given set of pixels, or further split hierarchically into smaller PUs. Each PU defines separately how it will predict its pixel values from previously coded pixel values.

In a similar fashion, the transforming of the prediction error is done in Transform Units (TUs), which may be the same size as CUs or split hierarchically into smaller sizes. The prediction error is transformed separately for each TU.

A H.265 encoder can be implemented by restricting the size of the CUs, PUs and TUs so that they are all either 16×16 or 8×8 pixels. This gives 3 options for each 16×16 block of pixels:

1. 16×16 CU and PU with 16×16 TU,
2. 16×16 CU and PU with four 8×8 TUs or
3. four 8×8 CUs each with a single 8×8 PU and TU.

Figure 1:
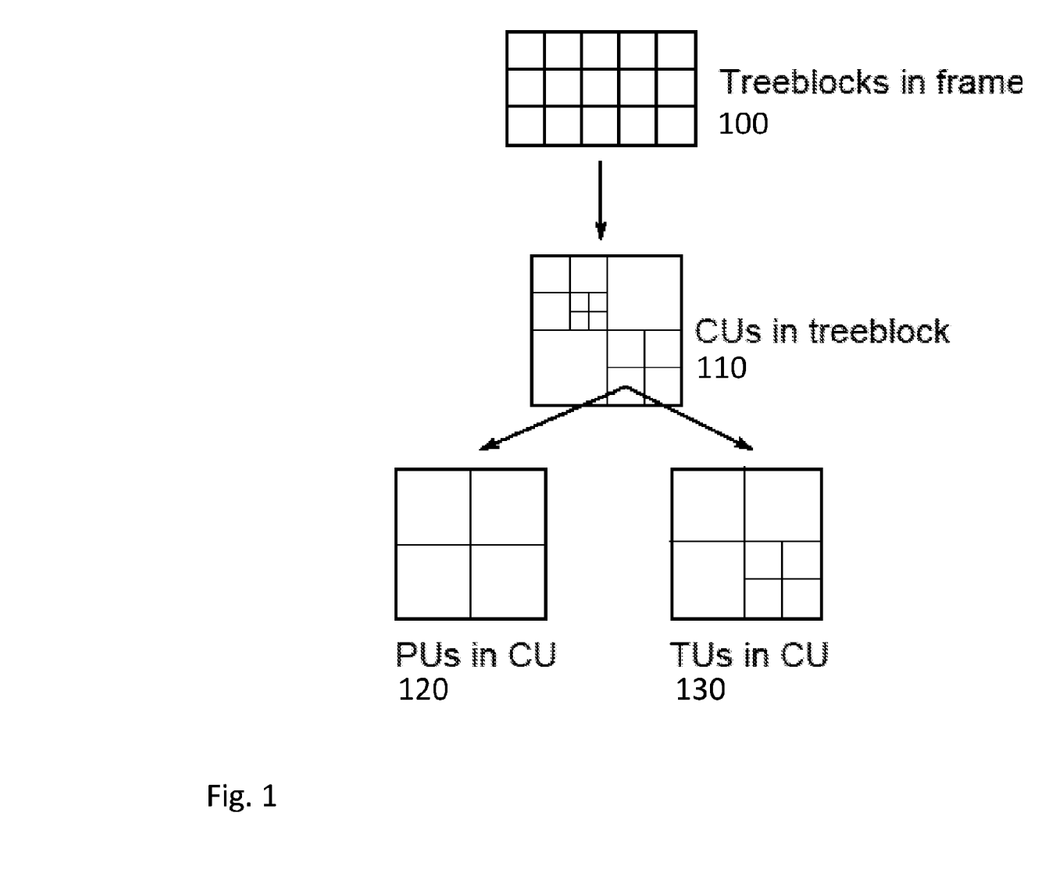
FIG. 1 is a diagram showing the various block types used in H.265 according to prior art.

Note that in all the above cases the CU is the same size as the PU. However, another combination of 16×16 and 8×8 blocks is possible for which this is not true: this is the case where the CU is one 16×16 block, the PUs are four 8×8 blocks and where the TU is a single 16×16 block. By disallowing this combination in the encoder, it is possible to use the simplifying assumption that the size of the PU is always the same as the size of the CU. The division of the treeblocks 100 into CUs 110 and PUs 120 and TUs 130 in the CUs is illustrated in FIG. 1.

The most straight-forward way of determining the size of CUs, TUs and PUs is to try different sizes, measure the amount of bits used and the error for each size, and choose the one which is best according to some metric. This is what, for example, the reference software for H.265 does.

A problem with the exemplified solutions above is that evaluating different block-sizes are costly. Evaluating just one transform unit size takes around 15% of the total encoding time. This means that evaluating two transform sizes would increase encoding time by around 15%, which is certainly a problem when fast encoding is a key requirement. Even worse, evaluating one prediction unit size takes around 30% of the total encoding time.

SUMMARY

The embodiments present ways of making certain decisions in the encoder much faster than with a typical solution according to prior art. Even though some compression efficiency needs to be sacrificed, in a real-time encoder implementation this has been found to be a good trade-off.

A method of quickly choosing a block size without fully evaluating all options is provided. This means that it is possible to get much of the benefit of having different block sizes, while increasing encoder complexity very little.

Briefly, embodiments entail comparing the prediction error for an entire block with the prediction error for each quarter of the block. If a large portion of the error is found to lie within one of the quarters, we assume that splitting the block into quarters may be beneficial. Otherwise, a single large block is used.

According to a first aspect of embodiments of the present invention, a method for encoding a bitstream representing a sequence of pictures of a video stream is provided. The pictures are divided into units which are further divided into blocks of a first size, wherein the blocks can be divided further into four quarter blocks of a second size. In the method, it is determined if a unit should be divided into blocks of the first size or quarter blocks of the second size to be used for encoding the units, by: calculating a result of at least one comparison involving a scaled version of a first error measure associated with one of the quarter blocks, a scaled version of a second error measure associated with at least the remaining quarter blocks and a threshold C.

When at least one of said comparisons gives a Boolean result of a first kind, it is determined that the unit could be divided into quarter blocks of the second size to be used for encoding the picture.

When all of said comparisons give a Boolean result of a second kind different from the first kind, wherein the Boolean result of the second kind is indicative of a difference being smaller than if the Boolean result would be of the first kind, wherein said difference is the scaled version of the second error measure subtracted from the scaled version of the first error measure, it is determined that the unit should be divided into blocks of the first size to be used for encoding the picture.

According to a second aspect of embodiments of the present invention, an encoder for encoding a bitstream representing a sequence of pictures of a video stream is provided. The encoder is configured to encode pictures which are divided into units which are further divided into blocks of a first size, wherein the blocks can be divided further into four quarter blocks of a second size. The encoder comprises a processor and a memory. Said memory contains instructions executable by said processor whereby said encoder is operative to calculate a result of at least one comparison involving a scaled version of a first error measure associated with one of the quarter blocks, a scaled version of a second error measure associated with at least the remaining quarter blocks and a threshold C.

The encoder is operative to determine that the unit could be divided into quarter blocks of the second size to be used for encoding the picture when at least one of said comparisons gives a Boolean result of a first kind. Further, the encoder is operative to determine that the unit should be divided into blocks of the first size to be used for encoding the picture when all of said comparisons give a Boolean result of a second kind different from the first kind. The Boolean result of the second kind is indicative of a difference being smaller than if the Boolean result would be of the first kind, wherein said difference is the scaled version of the second error measure subtracted from the scaled version of the first error measure.

In general, the benefit of the embodiments is that much of the gain from using different block sizes can be realized without much increase in encoder complexity. For TUs, it is possible to select a good, though not optimal, size while only performing one transform per pixel. For PUs, it is possible to greatly reduce the number of blocks where it is needed to perform prediction for two separate PU sizes.

DETAILED DESCRIPTION

The embodiments described herein relates to video encoding and how to divide the pictures of a video stream into smaller blocks which are used for encoding. As mentioned above, a method of quickly choosing a block size without fully evaluating all options is provided.

Figure 2A:
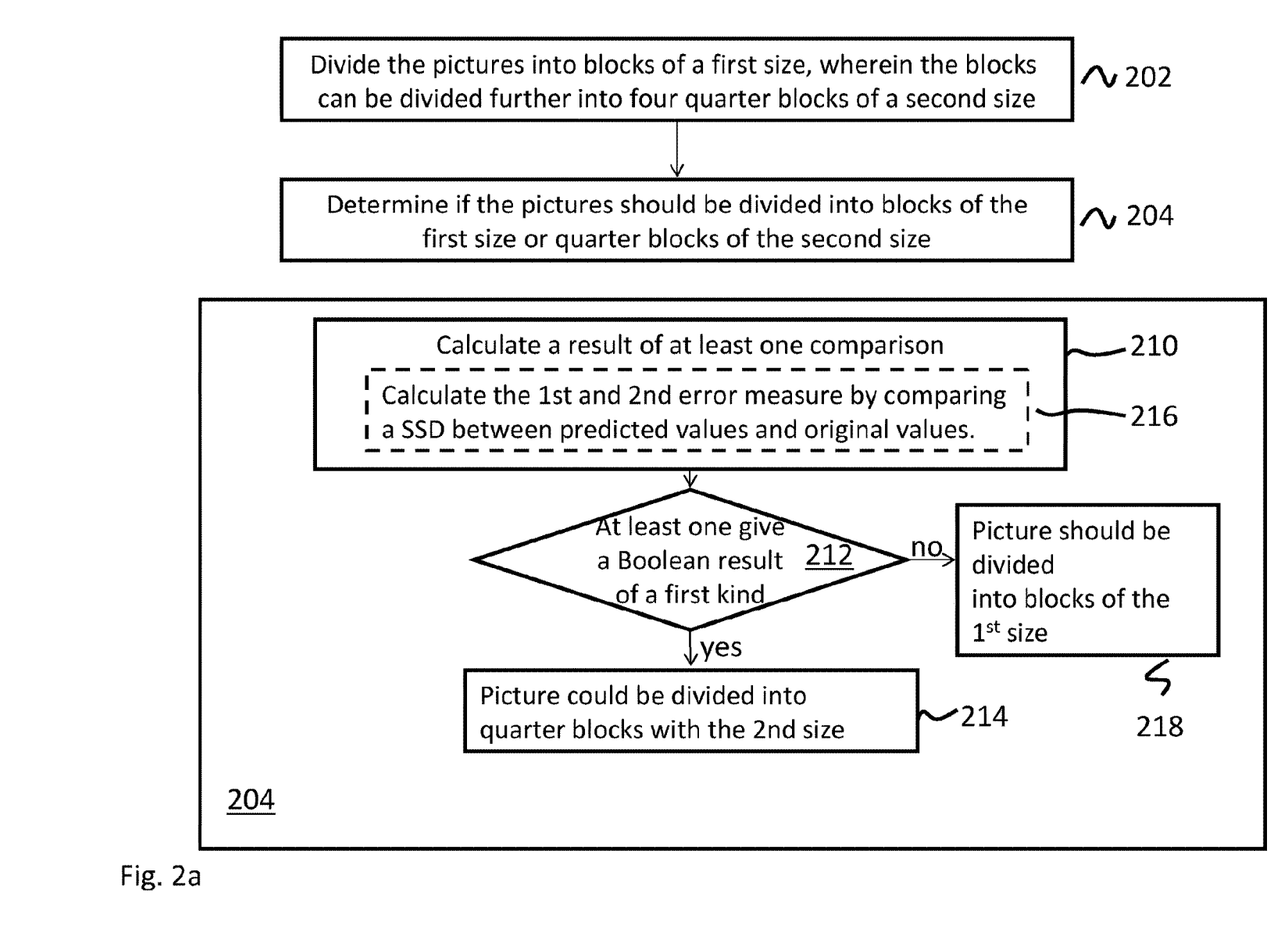
FIG. 2a is a flowchart of embodiments of the present invention.
Figure 2B:
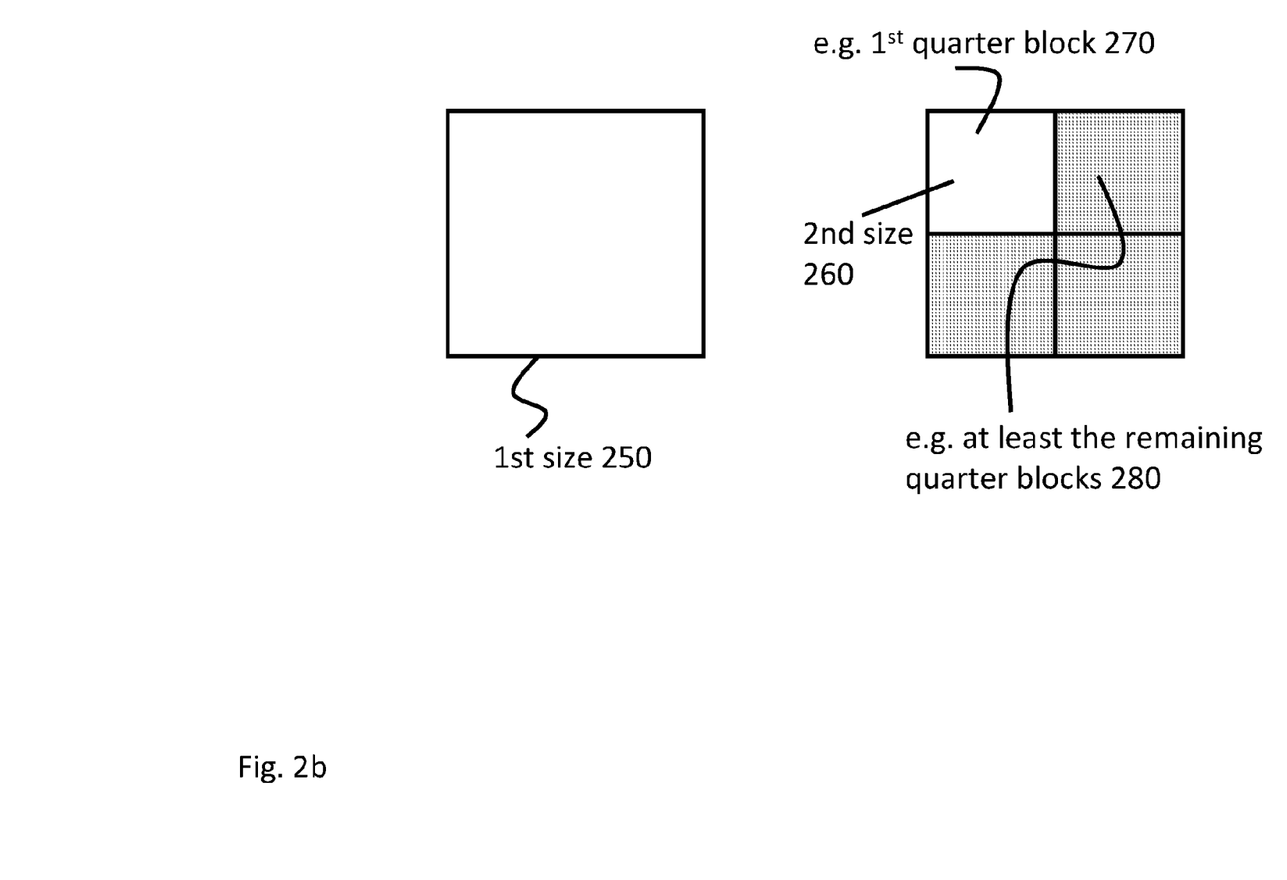
FIG. 2b illustrates schematically the blocks of a first size and the quarter blocks of the second size.

Accordingly, the embodiments relate to a method for encoding a bitstream representing a sequence of pictures of a video stream as illustrated in FIG. 2a. The pictures are divided into units (e.g. coding units) which are further divided 202 into blocks 280 with a first size 250 e.g. 16×16 pixels, wherein the blocks can be divided further into four quarter blocks 270 with a second size 260 e.g. 8×8 as illustrated in FIG. 2b.

Hence, it is determined 204 if the units should be divided into blocks of the first size or quarter blocks of the second size to be used for encoding the unit. The determination 204 is made by calculating 210 a result of at least one comparison involving a scaled version of a first error measure associated with one of the quarter blocks, a scaled version of a second error measure associated with at least the remaining quarter blocks and a threshold C.

When at least one of said comparisons gives a Boolean result of a first kind, it is determined 214 that the unit could be divided into quarter blocks of the second size to be used for encoding the picture. The Boolean result of a first kind may be that the difference between a scaled version of the first error measure and a scaled version of the second error measure is larger than a threshold C.

When no one of said comparisons gives a Boolean result of a first kind, all of said comparisons give a Boolean result of a second kind. The Boolean result of the second kind is different from the first kind, wherein the Boolean result of the second kind is indicative of a difference being smaller than if the Boolean result would be of the first kind, wherein said difference is the scaled version of the second error measure subtracted from the scaled version of the first error measure.

Hence when all of said comparisons give a Boolean result of a second kind different from the first kind, wherein the Boolean result of the second kind is indicative of a difference being smaller than if the Boolean result would be of the first kind, wherein said difference is the scaled version of the second error measure subtracted from the scaled version of the first error measure it is determined 218 that the unit should be divided into blocks of the first size to be used for encoding the picture. The Boolean result of the second kind may imply that the difference between a scaled version of the first error measure and a scaled version of the second error measure is lower than a threshold C.

Accordingly, the determination 204 can be made by comparing at least a first error measure only associated with one of the quarter blocks with a second error measure associated with at least the remaining quarter blocks. When at least one difference between a scaled version of an error measure only associated with one of the quarter blocks and a scaled version of the second error measure is larger than a threshold C, it is determined that the unit could be divided into quarter blocks of the second size to be used for encoding the picture. I.e. as soon as there is at least one quarter block it can be decided that the blocks with the second size should be used or that the blocks with the second sized should be fully evaluated.

Thus, when no difference between a scaled version of an error measure only associated with one of the quarter blocks and a scaled version of the second error measure is larger than a threshold C, it is determined that the unit should be divided into blocks of the first size to be used for encoding the picture. That implies that none of the quarter blocks has an error measure, wherein the difference between the scaled version of the error measure only associated with one of the quarter blocks and a scaled version of the second error measure is larger than the threshold C.

It should be noted that the scaling of the first error measure may be different from or equal to the scaling of the second error measure. The scaling can be performed by multiplying an error measure by a constant, by multiplying each term in the error measure by a constant or e.g. by calculating the error measure for only a part of the pixels.

The comparing the at least a first error measure only associated with one of the quarter blocks with a second error measure associated with at least the remaining quarter blocks can be done by calculating 216 the first error measure as a sum of squared differences, SSD, between predicted values and original values of said quarter block, and by calculating 216 the second error measure as a sum of squared differences, SSD, between predicted values and original values of at least said remaining quarter blocks.

Accordingly, when the difference between the scaled version of the first error measure and the scaled version of the second error measure is not larger than the threshold C, this process is repeated for the other quarter blocks as long as the difference between the scaled version of the first error measure and the scaled version of the second error measure is not larger than the threshold C. As soon as the difference between the scaled version of the first error measure and the scaled version of the second error measure is larger than the threshold C, it is determined that the unit could be divided into quarter blocks of the second size to be used for encoding the picture.

When the difference between the scaled version of the first error measure and the scaled version of the second error measure is not larger than the threshold C, the determination is made by comparing a scaled version of a third error measure only associated with a second quarter block with a scaled version of a fourth error measure associated at least with the remaining quarter blocks.

When the difference between the scaled version of the third error measure and the scaled version of the fourth error measure is larger than the threshold C it is determined that the unit could be divided into quarter blocks of the second size to be used for encoding the picture.

When the difference between the scaled version of the third error measure and the scaled version of the fourth error measure is not larger than the threshold C, the determination is made by comparing a scaled version of a fifth error measure only associated with a third quarter block with a scaled version of a sixth error measure associated at least with the remaining quarter blocks.

When the difference between the scaled version of the fifth error measure and the scaled version of the sixth error measure is larger than the threshold C it is determined that the unit could be divided into quarter blocks of the second size to be used for encoding the picture.

When the difference between the scaled version of the fifth error measure and the scaled version of the sixth error measure is not larger than the threshold C, the determination is made by comparing a scaled version of a seventh error measure only associated with a fourth quarter block with a scaled version of an eighth error measure associated at least with the remaining quarter blocks.

When the difference between the scaled version of the seventh error measure and the scaled version of the eighth error measure is larger than the threshold C it is determined that the unit could be divided into quarter blocks of the second size to be used for encoding the picture.

When the difference between the scaled version of the seventh error measure and the scaled version of the eighth error measure is not larger than the threshold C it is determined that the unit should be divided into blocks of the first size to be used for encoding the picture.

It should be noted that any scaling, including scaling with 1.0 could be used for the error measures and that the threshold could be any value and the scaling factors can be equal or different for the error measures. Moreover, the first quarter block could be any quarter block of the four quarter blocks. In addition, the comparison of the difference of the error measures with the threshold C could also be done by using larger than or equal to.

As an example, let the first error measure equal the summed squared difference (SSD) of the top left quarter of the block, and call it $SSD_{quarter1}$. Also let the second error measure equal the SSD of the entire block, and call it $SSD_{16\times16}$. Now, if indeed 16×16 is a good block size for this area, it can be assumed that the remaining error will be distributed quite evenly over the 16×16 pixels. Assume it is not; assume for instance that all the error is in the top left 8×8 pixels. Then it would most likely make sense to process this information differently from the other three quarters of the block; perhaps it needs a different motion vector for instance. Hence it makes sense to compare the SSD in the top left block (which is $SSD_{quarter1}$) with the error that would be the case if the error was perfectly evenly distributed over the 16×16 pixels, namely one fourth of $SSD_{16\times16}$. Thus we should compare the first error measure ($SSD_{quarter1}$) (scaled with 1) with the second error measure ($SSD_{16\times16}$) scaled with e.g. (¼). We could then test whether the difference $$SSD_{quarter1} - SSD_{16\times16}/4 > 0.$$

However, it may be the case that even a difference of zero may not be sufficient for it to be better to split the block. Hence a threshold is introduced, and only if the difference is larger than the threshold, the block is split:

$$SSD_{quarter1} - SSD_{16\times16}/4 > C.$$

This can be rewritten as $$SSD_{quarter1} > SSD_{16\times16}/4 + C.$$

Now, this formula is tried for more quarter blocks, i.e., first we try if $$SSD_{quarter1} > SSD_{16\times16}/4 + C.$$

If this is not the case, then we also try $$SSD_{quarter2} > SSD_{16\times16}/4 + C,$$

where $SSD_{quarter2}$ is the error measure associated with the top right corner. If this statement is also false, we try $$SSD_{quarter3} > SSD_{16\times16}/4 + C,$$

where $SSD_{quarter3}$ is the error measure associated with the bottom left corner. If this statement is also false, we finally try $$SSD_{quarter4} > SSD_{16\times16}/4 + C,$$

where $SSD_{quarter4}$ is the error measure associated with the bottom right corner. If this statement is also false, then we know that the error is rather evenly distributed throughout the block. Hence it is likely that 16×16 is a good block size in this case, and we can select this block size. However, if, for instance, $SSD_{quarter3} > SSD_{16\times16}/4 + C$, returns true, we know that the error is not evenly distributed. In this case we do not need to test the fourth statement ($SSD_{quarter4} > SSD_{16\times16}/4 + C$) since we already know that the error is unevenly distributed. In this case we can either go for a division into four 8×8 blocks or we can choose to calculate what the error would be if four 8×8 blocks would be used and compare that to $SSD_{16\times16}$. If the error would be sufficiently smaller to compensate for the extra bit-cost of splitting, we could choose the four 8×8 blocks. If the error would be larger, or not sufficiently smaller to compensate for the extra bit-cost of splitting, we would stick with the 16×16 block size.

In the above case the second, fourth, sixth and eighth error measure are all equal to.

In an alternate embodiment, they may be different. For instance, the second error measure could be calculated over all quarters except the top left one, the fourth error measure could be calculated over all quarters except the top right one, the sixth error measure could be calculated over all quarters except the bottom left one and the eighth error measure could be calculated over all quarters except the bottom right one.

Other scaling factors can be useful too. As an example, assume we want to investigate whether the following previous test holds:

$$SSD_{quarter1} > SSD_{16 \times 16}/4 + C.$$

The second error measure from $SSD_{16 \times 16}$ in this example is calculated over all 16×16 pixels. If we say that $SSD_{quarter1}$ is calculated over the top left 8×8 pixels, $SSD_{quarter2}$ is calculated over the top right 8×8 pixels, $SSD_{quarter3}$ is calculated over the bottom left 8×8 pixels and $SSD_{quarter4}$ is calculated over the bottom right 8×8 pixels, then it trivially holds that $$SSD_{16 \times 16} = SSD_{quarter1} + SSD_{quarter2} + SSD_{quarter3} + SSD_{quarter4}.$$

Inserting that to the inequality above gives $$SSD_{quarter1} > (SSD_{quarter1} + SSD_{quarter2} + SSD_{quarter3} + SSD_{quarter4})/4 + C$$

which is equivalent to the following inequality:

$$(3/4)*SSD_{quarter1} > (SSD_{quarter2} + SSD_{quarter3} + SSD_{quarter4})/4 + C.$$

Multiplying both sides with (4/3) gives $$SSD_{quarter1} > (SSD_{quarter2} + SSD_{quarter3} + SSD_{quarter4})/3 + (4/3)*C.$$

But we can now define a new second error measure $SSD_{192}$ which depends only on the three quarters of the block that is dashed in the right hand diagram in FIG. 2b. (We denote it here by 192 since it relies only on the 192 pixels that are dashed.) We can also introduce a new constant $K=(4/3)*C$ and we get $$SSD_{quarter1} > (SSD_{192})/3 + K.$$

As we can see now, we are back to the original test, where the difference of a first error measure ($SSD_{quarter1}$) and a scaled version of (scale factor is ⅓) of a second error measure ($SSD_{192}$) is compared to a threshold K.

Instead of comparing the difference between a first error measure and a scaled version of a second error measure, it is of course possible to compare scaled versions of both error measures. For instance, the above equation is equivalent of testing $$(3/4)*SSD_{quarter1} > (1/4)*(SSD_{192}) + C,$$

where both error measures are scaled.

It is also possible to put the scaling factor on the other error measure; the above equation is also equivalent to testing $$3*SSD_{quarter1} > SSD_{192} + K',$$

where $K'=3*K$.

In the above discussion we have first calculated aggregate error measurements such as $SSD_{192}$ and $SSD_{16 \times 16}$ and then scaled the resulting value. As an example, the value $SSD_{192}$ can be calculated by summing the squared error between the original pixel intensity value Y and the approximate intensity value Y':

$$SSD_{192} = (Y_1 - Y'_1)^2 + (Y_2 - Y'_2)^2 + (Y_3 - Y'_3)^2 + \ldots + (Y_{192} - Y'_{192})^2.$$

This value is later scaled with (⅓). Sometimes however, it is advantageous to instead multiply the individual terms in the above equation:

$$SSD'_{192} = (1/3)*(Y_1 - Y'_1)^2 + (1/3)*(Y_2 - Y'_2)^2 + \ldots + (1/3)*(Y_{192} - Y'_{192})^2.$$

This alternative error measure $SSD'_{192}$ does not have to be scaled when performing the test $$SSD_{quarter1} > (SSD'_{192}) + K.$$

since this has already been done when computing the error measure, but it results in the same thing.

Calculating error measures exactly can involve a lot of arithmetical operations and can therefore be costly. For example to calculate $SSD_{16 \times 16}$ a total of 256 subtractions and squares have to be used, as well as additions:

$$SSD_{16 \times 16} = (Y_1 - Y'_1)^2 + (Y_2 - Y'_2)^2 + (Y_3 - Y'_3)^2 + \ldots + (Y_{256} - Y'_{256})^2.$$

Since luminance values that are close to each other are often similar, it may be sufficient to calculate, say, every second pixel, and assume that the neighboring pixel would result in a similar value. For instance, if we assume that all the odd values (such as $Y_1$ and $Y'_1$) are similar to all the even values ($Y_2$ and $Y'_2$ respectively), we can approximate $(Y_2 - Y'_2)^2$ by $(Y_1 - Y'_1)^2$ and $(Y_1 - Y'_1)^2 + (Y_2 - Y'_2)^2$ can be approximated by $2(Y_1 - Y'_1)^2$. So $SSD_{16 \times 16}$ can be approximated as $$SSD_{16 \times 16} \sim 2(Y_1 - Y'_1)^2 + 2(Y_3 - Y'_3)^2 + 2(Y_5 - Y'_5)^2 + \ldots + 2(Y_{255} - Y'_{255})^2$$

Let $SSD_{16 \times 16\_odd}$ be the error measure of the odd pixels:

$$SSD_{16 \times 16\_odd} = (Y_1 - Y'_1)^2 + (Y_3 - Y'_3)^2 + (Y_5 - Y'_5)^2 + \ldots + (Y_{255} - Y'_{255})^2.$$

We can now see that $SSD_{16 \times 16}$ can be approximated as $$SSD_{16 \times 16} \sim 2 SSD_{16 \times 16\_odd}.$$

If we instead take every fourth pixel we get that $$SSD_{16 \times 16} \sim 4 SSD_{16 \times 16\_every\_fourth}.$$

This then means that $(1/4)*SSD_{16 \times 16}$ can be approximated by $SSD_{16 \times 16\_every\_fourth}$.

Hence, in an alternate embodiment, it is possible to test the condition $$SSD_{quarter1} > SSD_{16 \times 16\_every\_fourth} + C$$

instead of $$SSD_{quarter1} > SSD_{16 \times 16}/4 + C.$$

In this case we have scaled the error measurement by using only every fourth pixel instead of using every pixel and dividing the resulting value by four.

Furthermore, the error measure does not need to be the summed square difference. An alternative is to use summed absolute difference:

$$SAD_{16 \times 16} = |Y_1 - Y'_1| + |Y_2 - Y'_2| + |Y_3 - Y'_3| + \ldots + |Y_{256} - Y'_{256}|.$$

where |•| denotes absolute value.

There are also other possible error measures and approximations of these error measures, such as errors taken to the fourth power $(Y_1 - Y'_1)^4$ etc.

Note that the scaling factor can be 1.0 and the constant C can be equal to 0. Hence, in one embodiment of the invention, testing if the difference between the first error measure and the scaled version of the second error measure is larger than a threshold can result in testing $$SSD_{quarter1} > SSD_{16 \times 16}.$$

According to another embodiment, the scaling factor may be different from zero but the threshold may be zero. Hence, testing if the difference between the first error measure and the scaled version of the second error measure is larger than a threshold can be done by testing $$SSD_{quarter\ 1} > k \cdot SSD_{16 \times 16}.$$

Where k is the scaling coefficient.

Furthermore, it is possible to make this scaling coefficient a function of the quantization parameter QP. In such an embodiment, the first error measure may be compared with the second error measure by using $SSD_{quarter\ block\ 1} > f_2(QP) \cdot SSD_{block}$ The first error measure is $SSD_{quarter\ block\ 1}$ and the second error measure is $SSD_{block}$ and wherein $SSD_{quarter\ block\ 1}$ is the SSD for a first quarter block and $SSD_{block}$ is the SSD for at least the remaining quarter blocks, $f_1(QP)$ is a function of QP where QP is a quantization parameter. In this case, the threshold is zero and the scaling of the second error measure is done by multiplying $SSD_{block}$ with $f_1(QP)$. It should be noted that the $SSD_{quarter\ block\ 1}$ could be any of the four quarter blocks. The quantization parameter QP is a parameter controlling the quantization.

The first error measure may also be compared with the second error measure by using:

$$SSD_{quarter\ block\ 1} > f_1(QP) \cdot SSD_{block} + f_2(QP).$$

The first error measure is $SSD_{quarter\ block\ 1}$ and the second error measure is $SSD_{block}$ wherein $SSD_{quarter\ block\ 1}$ is the SSD for a first quarter block and $SSD_{block}$ is the SSD for at least the remaining quarter blocks, $f_1(QP)$ is a function of QP where QP is a quantization parameter and $f_2(QP)$ is another function of QP. $f_2(QP)$ is the threshold and the scaling of the second error measure is done by multiplying $SSD_{block}$ with $f_1(QP)$.

As an alternative, the first error measure may also be compared with the second error measure by using:

$SSD_{quarter\ block\ 1} > SSD_{block}/4 + f_2(QP)$. The first error measure is $SSD_{quarter\ block\ 1}$ and the second error measure is $SSD_{block}$ wherein $SSD_{quarter\ block\ 1}$ is the SSD for the first quarter block and $SSD_{block}$ is the SSD for at least the remaining quarter blocks, and $f_2(QP)$ is a function of QP. $f_2(QP)$ is the threshold and the second error measure is scaled by $\frac{1}{4}$.

The first size, i.e. the size of the blocks may be 16×16 pixels and the second size, i.e. the size of the quarter blocks may be 8×8 pixels. Further, the blocks and quarter blocks are transform units or prediction units. The bitstream can be encoded according to HEVC or H.264 but the embodiments are not limited to HEVC or H.264.

The embodiments above are further exemplified below where blocks of size 16×16 have been used. In this case, the objective is to decide whether to use a single 16×16 transform or to use four 8×8 transforms. As described earlier, it is not desired to evaluate both options since that is too time consuming, instead it is advantageous to be able to choose a size quickly and then perform the appropriate transforms.

In order to make the decision whether to use a single 16×16 transform or to use four 8×8 transforms, first the pixel values in the block are predicted. Then the sum of squared differences (SSD) between our predicted values and the original ones for the 16×16 block are calculated, and separately for its four 8×8 quarters. Once this has been done it is checked, for each quarter, if the difference between the scaled version (scaling with 1) of the first error measure and the scaled version of the second error measure is larger than a threshold C e.g. by using $SSD_{quarter} > SSD_{16 \times 16}/4 + C$. C in this example is a constant that is set to $2^{QP/3}$, where QP is a quantization parameter used in video coding to govern the quality level, with low QP resulting in higher quality.

If a quarter meets the criteria, we surmise that the error is unevenly distributed and 8×8 transforms would be more suitable for the block. If no quarter fulfills the criteria, we apply a 16×16 transform.

The use of QP as part of the decision means that high quality encodings will get low values of C and therefore almost exclusively use 8×8 transforms, and low quality encodings get high values of C and almost always use the cheaper 16×16 transforms.

In another example, the objective is to decide whether to use 16×16 or 8×8 PUs (prediction units). In order to do this, we first do an evaluation of the full 16×16 block. We then want to evaluate the four 8×8 quarters to determine which size to use, but this is deemed too expensive. In order to reduce the complexity cost, we opt to only perform this full evaluation and comparison of the two sizes for some of the blocks. We to this using the same formula as above: we calculate the SSDs and check whether $SSD_{quarter} > SSD_{16 \times 16}/4 + C$ for any of the four quarters. If so, we check if using PUs with a size of 8×8 pixels is better.

Note that for transform units (TUs), we may simply choose a size based on the formula, whereas for PUs we may use the formula merely to decide whether to evaluate the smaller size. This is because we need to evaluate at least one PU size in order to calculate the SSDs. If we already have evaluated 16×16 PUs and then determine that 8×8 might be better, it makes more sense to evaluate it and compare the two than to blindly use 8×8. So for PUs, the determining that the unit should be divided into quarter blocks of the second size to be used for encoding the picture, implies that the quarter blocks of the second size are evaluated before taking the final decision on the block sizes.

Accordingly, the blocks and the quarter blocks may be transform units (TUs) or prediction units (PUs).

The method according to the embodiments described above is performed by an encoder, e.g. an HEVC encoder.

Figure 3:
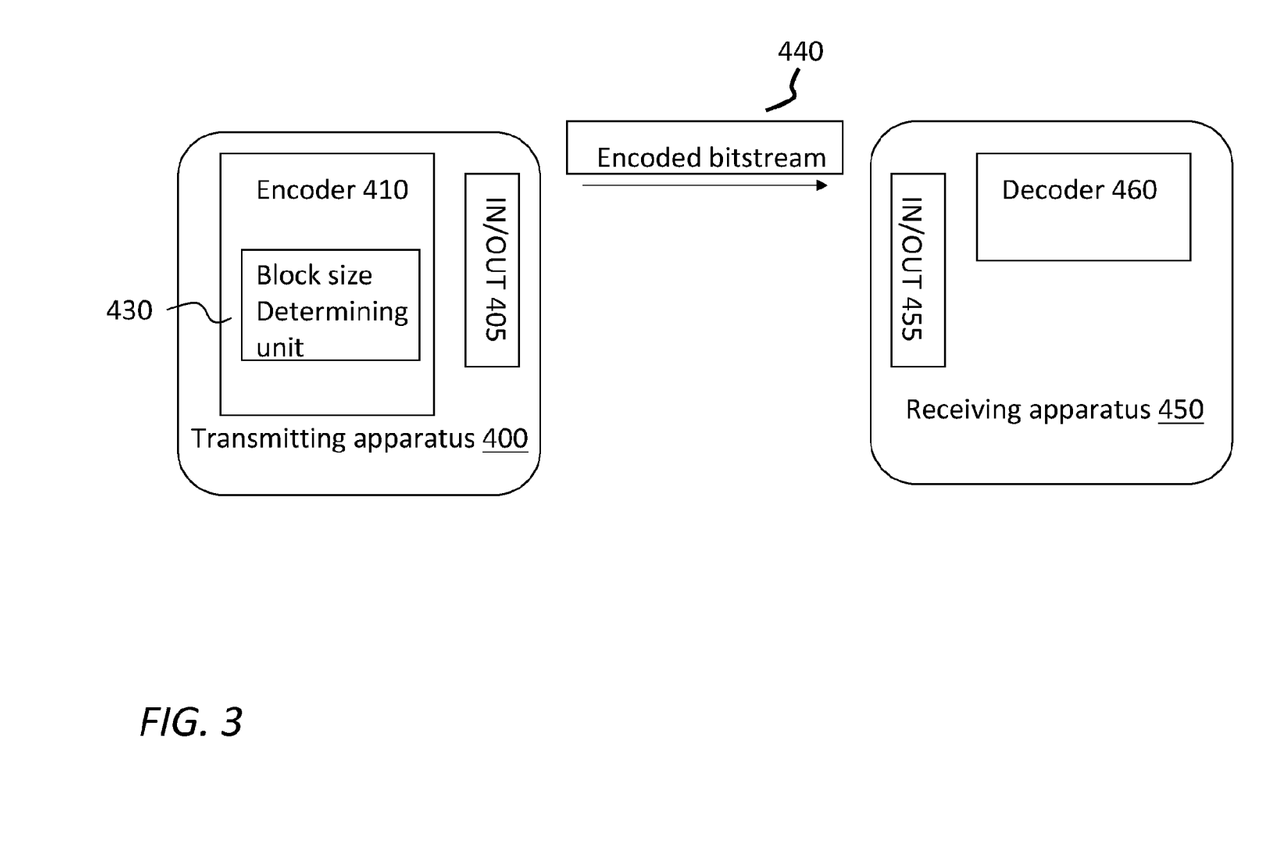
FIG. 3 illustrates schematically a transmitter implementing the embodiments of the present invention.

FIG. 3 illustrates an encoder 410 in a transmitting apparatus 400 such as a video camera e.g. implemented in a mobile device. The transmitting apparatus comprises an input/output section 405 for receiving the video to be encoded and for transmitting the encoded video 440. The encoder 410 comprises according to the embodiments a block size determining unit 430. The encoder is configured to encode pictures which are divided into units which are further divided into blocks of a first size, wherein the blocks can be divided further into four quarter blocks of a second size. The encoder 410 comprises a block size determining unit 430 configured to calculate a result of at least one comparison involving a scaled version of a first error measure associated with one of the quarter blocks, a scaled version of a second error measure associated with at least the remaining quarter blocks, and a threshold C. The block size determining unit 430 is configured to determine that the unit could be divided into quarter blocks of the second size to be used for encoding the picture when at least one of said comparisons gives a Boolean result of a first kind.

Further the block size determining unit 430 is configured to determine that the unit should be divided into blocks of the first size to be used for encoding the picture when all of said comparisons give a Boolean result of a second kind different from the first kind. The Boolean result of the second kind is indicative of a difference being smaller than if the Boolean result would be of the first kind, wherein said difference is the scaled version of the second error measure subtracted from the scaled version of the first error measure.

Further, the block size determining unit 430 is according to an embodiment further configured to calculate the first and second error measure by comparing a sum of squared differences (SSD) between predicted values and original values.

The encoder 410 encodes the units of the picture according to the determined size and the transmitting apparatus 400 sends the encoded bitstream 440 representing the sequence of pictures via the input/output section 405 to an input/output section 455 of a receiving apparatus 450. The receiving apparatus 450 comprises a decoder 460 for decoding the encoded bitstream. In addition, control information of the determined block sizes is sent from the encoder to the decoder.

Figure 4:
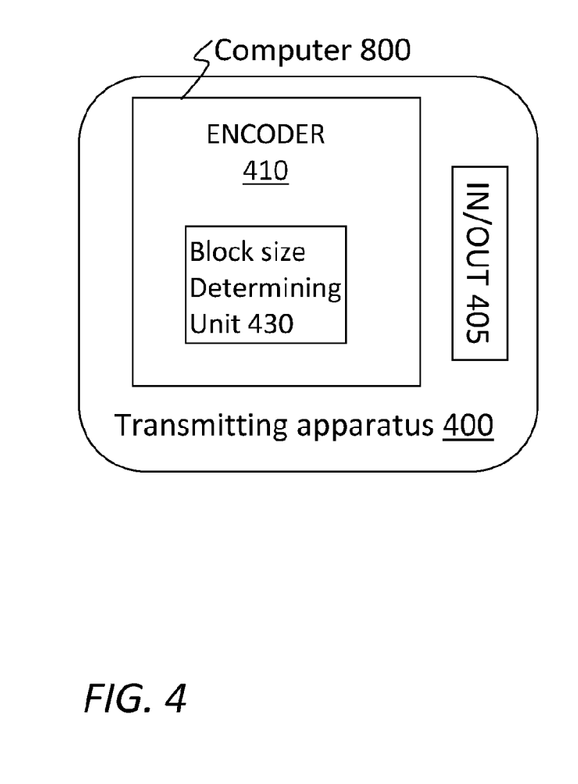
FIG. 4 illustrates schematically a computer implementation of the embodiments of the present invention.

As illustrated in FIG. 4, the encoder 410 can be implemented by a computer 800. The computer 800 comprises a processor 810 and a memory 820.

Said memory 820 contains instructions executable by said processor 810 whereby said encoder is operative to calculate a result of at least one comparison involving a scaled version of a first error measure associated with one of the quarter blocks, a scaled version of a second error measure associated with at least the remaining quarter blocks and a threshold C.

The encoder is operative to determine that the unit could be divided into quarter blocks of the second size to be used for encoding the picture, when at least one of said comparisons gives a Boolean result of a first kind.

Further, the encoder is operative to determine that the unit should be divided into blocks of the first size to be used for encoding the picture when all of said comparisons give a Boolean result of a second kind different from the first kind, wherein the Boolean result of the second kind is indicative of a difference being smaller than if the Boolean result would be of the first kind, wherein said difference is the scaled version of the second error measure subtracted from the scaled version of the first error measure.

According to an embodiment the encoder is operative to calculate the first and second error measure by comparing a sum of squared differences (SSD) between predicted values and original values.

Furthermore, the encoder may be operative to perform said comparisons in the form $s_1 SSD_{quarter\ block\ 1} > s_2 SSD_{block} + C$, where $SSD_{quarter\ block\ 1}$ is said first error measure, $s_1 SSD_{quarter\ block\ 1}$ is said scaled version of said first error measure, $SSD_{block}$ is the second error measure, $s_2 SSD_{block}$ is said scaled version of said second error measure, $s_1$ and $s_2$ are scaling factors, C is said threshold, where said Boolean result of a first kind is 'true' and said Boolean result of a second kind is 'false'.

The encoder may also be operative to perform said comparisons in the form $s_1 SSD_{quarter\ block\ 1} < s_2 SSD_{block} + C$, where $SSD_{quarter\ block\ 1}$ is said first error measure, $s_1 SSD_{quarter\ block\ 1}$ is said scaled version of said first error measure, $SSD_{block}$ is the second error measure, $s_2 SSD_{block}$ is said scaled version of said second error measure, $s_1$ and $s_2$ are scaling factors, C is said threshold, where said Boolean result of a first kind is 'false' and said Boolean result of a second kind is 'true'.

According to embodiments, the following can be used: $s_1=1$, $s_2=f_1(QP)$ and $C=0$, wherein $f_1(QP)$ is a function of QP where QP is quantization parameter.

In a further embodiment the following can be used: $s_1=1$, $s_2=f_1(QP)$ and $C=f_2(QP)$, wherein $f_1(QP)$ is a function of QP where QP is quantization parameter and $f_2(QP)$ is another function of QP.

In a yet further embodiment the following can be used $s_1=1$, $s_2=\frac{1}{4}$ and $C=f_2(QP)$, wherein $f_2(QP)$ is a function of QP, e.g. $f_2(QP)=2^{QP/3}$.

The invention claimed is:

1. A method of controlling video encoding, the method comprising:
   determining prediction errors at the block level, for a block of pixels comprising a coding unit of a picture to be encoded;
   determining whether the prediction errors are evenly distributed over the block by, for each of one or more selected quarter blocks of the block, comparing a first error metric determined from the prediction errors corresponding to the selected quarter block to a corresponding second error metric determined from the prediction errors corresponding to at least the remaining three quarter blocks of the block; and
   performing one or more encoding operations at the block level for the block of pixels, responsive to determining that the predication errors are evenly distributed over the block, and, otherwise, performing the one or more encoding operations at the quarter-block level for the block of pixels;
   wherein performing the one or more coding operations at the block level includes encoding with the prediction errors as determined at the block level, and wherein encoding at the quarter-block level includes at least one of: encoding with prediction errors as determined at the quarter-block level rather than the block level; and encoding with prediction error transformations as determined at the quarter-block level rather than the block level; and
   wherein comparing the first error metric to the second error metric comprises determining a difference between the first error metric and the second error metric, and deciding whether the prediction errors are evenly distributed over the block comprises determining whether the difference between the first error metric and the second error metric exceeds a defined threshold.

2. The method of claim 1, wherein determining whether the prediction errors are evenly distributed over the block comprises selecting quarter blocks for comparison, in succession, until encountering the first comparison that indicates that the prediction errors are not evenly distributed over the block.

3. The method of claim 1, wherein at least one of the first metric and the second metric is scaled to account for the first error metric being based on one quarter of the block and the second error metric being based on at least three quarters of the block.

4. The method of claim 1, wherein the first error metric comprises the sum of squared prediction errors for the prediction errors corresponding to the selected quarter block, and wherein the second error metric comprises the sum of squared prediction errors for the prediction errors corresponding to the at least three remaining quarter blocks.

5. The method of claim 1, wherein the first error metric comprises the sum of squared prediction errors for a distributed subset of the prediction errors corresponding to the selected quarter block, and wherein the second error metric comprises the sum of squared prediction errors for a distributed subset of the prediction errors corresponding to the at least three remaining quarter blocks.

6. The method of claim 1, wherein performing the encoding operations at the block level for the block of pixels, or at the quarter-block level for the block of pixels, comprises deciding whether to use the prediction errors as determined at the block level for encoding the block, or to use prediction errors as determined at the quarter-block level for encoding the block.

7. The method of claim 1, wherein performing the encoding operations at the block level for the block of pixels, or at the quarter-block level for the block of pixels, comprises performing transform coding of prediction errors at the block level in response to determining that the prediction errors are evenly distributed across the block, and performing transform coding of prediction errors at the quarter-block level in response to determining that the prediction errors are not evenly distributed across the block.

8. An encoder configured to control video encoding, the encoder comprising:
   a memory; and
   a processor operative to execute instructions stored in the memory, whereby the processor is configured to:
      determine prediction errors at the block level, for a block of pixels comprising a coding unit of a picture to be encoded;
      determine whether the prediction errors are evenly distributed over the block by, for each of one or more selected quarter blocks of the block, comparing a first error metric determined from the prediction errors corresponding to the selected quarter block to a corresponding second error metric determined from the prediction errors corresponding to at least the remaining three quarter blocks of the block; and
      perform one or more encoding operations at the block level for the block of pixels, responsive to determining that the predication errors are evenly distributed over the block, and, otherwise, performing the one or more encoding operations at the quarter-block level for the block of pixels, and wherein performing the one or more coding operations at the block level includes encoding with the prediction errors as determined at the block level, and wherein encoding at the quarter-block level includes at least one of: encoding with prediction errors as determined at the quarter-block level rather than the block level; and encoding with prediction error transformations as determined at the quarter-block level rather than the block level; and
   wherein the processor is configured to compare the first error metric to the second error metric by determining a difference between the first error metric and the second error metric and to decide whether the prediction errors are evenly distributed over the block based on determining whether the difference between the first error metric and the second error metric exceeds a defined threshold.

9. The encoder of claim 8, wherein the processor is configured to determine whether the prediction errors are evenly distributed over the block by selecting quarter blocks for comparison, in succession, until encountering the first comparison that indicates that the prediction errors are not evenly distributed over the block.

10. The encoder of claim 8, wherein at least one of the first metric and the second metric is scaled to account for the first error metric being based on one quarter of the block and the second error metric being based on at least three quarters of the block.

11. The encoder of claim 8, wherein the first error metric comprises the sum of squared prediction errors for the prediction errors corresponding to the selected quarter block, and wherein the second error metric comprises the sum of squared prediction errors for the prediction errors corresponding to the at least three remaining quarter blocks.

12. The encoder of claim 8, wherein the first error metric comprises the sum of squared prediction errors for a distributed subset of the prediction errors corresponding to the selected quarter block, and wherein the second error metric comprises the sum of squared prediction errors for a distributed subset of the prediction errors corresponding to the at least three remaining quarter blocks.

13. The encoder of claim 8, wherein the processor is configured to perform the encoding operations at the block level for the block of pixels, or at the quarter-block level for the block of pixels, based on deciding whether to use the prediction errors as determined at the block level for encoding the block, or to use prediction errors as determined at the quarter-block level for encoding the block.

14. The encoder of claim 8, wherein the processor is configured to perform the encoding operations at the block level for the block of pixels, or at the quarter-block level for the block of pixels, by performing transform coding of prediction errors at the block level in response to determining that the prediction errors are evenly distributed across the block, and performing transform coding of prediction errors at the quarter-block level in response to determining that the prediction errors are not evenly distributed across the block.

* * * * *